United States Patent
Ernst

(10) Patent No.: US 11,359,742 B2
(45) Date of Patent: Jun. 14, 2022

(54) PRESSURE REDUCING VALVE AND METHOD FOR OPERATING THE SAME

(71) Applicant: Pittway Sarl, Rolle (CH)

(72) Inventor: Dominik Ernst, Elztal (DE)

(73) Assignee: Pittway Sarl, Rolle (CH)

( * ) Notice: Subject to any disclaimer, the term of this patent is extended or adjusted under 35 U.S.C. 154(b) by 0 days.

(21) Appl. No.: 17/168,661

(22) Filed: Feb. 5, 2021

(65) Prior Publication Data

US 2021/0246996 A1 Aug. 12, 2021

(30) Foreign Application Priority Data

Feb. 12, 2020 (EP) ..................................... 20156994

(51) Int. Cl.
*F16K 31/385* (2006.01)
*F16K 7/17* (2006.01)

(52) U.S. Cl.
CPC ............ *F16K 31/3855* (2013.01); *F16K 7/17* (2013.01)

(58) Field of Classification Search
CPC ........ F16K 31/365; F16K 7/17; G05D 16/163
See application file for complete search history.

(56) References Cited

U.S. PATENT DOCUMENTS

| | | | | |
|---|---|---|---|---|
| 436,235 A | * | 9/1890 | Griffin | G05D 16/163 137/495 |
| 2,221,729 A | * | 11/1940 | Vance | F16K 31/365 251/323 |
| 2,309,848 A | * | 2/1943 | King | G05D 16/163 137/484.2 |
| 3,087,430 A | * | 4/1963 | Griswold | G05D 16/163 415/49 |
| 3,706,320 A | * | 12/1972 | Kalsi | G05D 16/163 137/487 |
| 4,715,578 A | * | 12/1987 | Seltzer | F16K 7/17 251/25 |
| 5,967,167 A | * | 10/1999 | Johnson | A01K 39/02 137/14 |
| 6,173,735 B1 | | 1/2001 | Perry, Jr. et al. | |
| 9,052,020 B2 | | 6/2015 | Noceti | |
| 2008/0023662 A1 | * | 1/2008 | Reinicke | F16K 15/1823 251/58 |

FOREIGN PATENT DOCUMENTS

| | | |
|---|---|---|
| DE | 102007026162 A1 | 5/2008 |
| DE | 102016002834 A1 | 2/2017 |
| DE | 102018205016 A1 | 10/2019 |
| EP | 3477122 A | 5/2019 |
| FR | 590737 A * 6/1925 | ........... F16K 31/365 |
| GB | 2129167 A | 5/1984 |
| JP | 2009201888 A | 9/2009 |
| JP | 2010176229 A | 8/2010 |

* cited by examiner

*Primary Examiner* — Umashankar Venkatesan
(74) *Attorney, Agent, or Firm* — Shumaker & Sieffert, P.A.

(57) ABSTRACT

A pressure reducing valve and a method for operating the pressure reducing valve. The pressure reducing valve may be used in a potable water system. The pressure reducing valve can be used for gaseous media and liquid media. Preferably, the pressure reducing valve is intended for use with liquid media, most preferably for potable water.

13 Claims, 2 Drawing Sheets

PRESSURE REDUCING VALVE AND METHOD FOR OPERATING THE SAME

CROSS-REFERENCE TO RELATED APPLICATIONS

This application claims priority pursuant to 35 U.S.C. 119(a) of European Patent Application No. 20156994.4, filed Feb. 12, 2020, which application is incorporated herein by reference in its entirety.

FIELD OF THE INVENTION

The invention relates to a pressure reducing valve. The invention further relates to a method for operating a pressure reducing valve.

BACKGROUND OF THE INVENTION

DE 10 2018 205 016 A1 discloses a pressure reducing valve comprising a housing and a valve insert. The housing has an inlet coupled with an inlet pressure zone and an outlet coupled with an outlet pressure zone. The valve insert is positioned within the housing. The valve insert connects the inlet pressure zone to the outlet pressure zone when the valve insert is opened. The valve insert separates the inlet pressure zone from the outlet pressure zone when the valve insert is closed. The valve insert comprises a valve stem, a spring element and a membrane. A first force provided by the spring element acts on a first side of the membrane which tends to open the valve insert. A second force depending on the outlet pressure within the outlet pressure zone acts on a second side of the membrane which tends to close the valve insert. A pressure zone positioned on the second side of the membrane is connected to the outlet pressure zone through a pressure duct provided by a through hole in the housing.

The pressure reducing valve of DE 10 2018 205 016 A1 provides a pressure reducing valve function only. In order to provide a shut off valve function a separate shut off valve needs to be installed in series connection with the pressure reducing valve. This involves an extra valve, extra space for the installation of the shut off valve and extra costs.

U.S. Pat. No. 9,052,020, JP 2009 201 888 A and JP 2010 176 229 A1 disclose other pressure reducing valves.

Against this background, a novel pressure reducing valve is provided.

BRIEF SUMMARY OF THE INVENTION

A pressure reducing valve, comprising a housing having an inlet providing an inlet pressure zone and an outlet providing an outlet pressure zone, further comprising a valve insert positioned within the housing, said the valve insert connects the inlet pressure zone to the outlet pressure zone when the valve insert is opened, said the valve insert separates the inlet pressure zone from the outlet pressure zone when the valve insert is closed, wherein the valve insert comprises a spring element and a membrane. The pressure reducing valve comprises a switch valve unit being coupled to the inlet pressure zone, the outlet pressure zone and to a pressure zone positioned on a side of the membrane such that in a first switching state of the switch valve unit the pressure zone positioned on the second side of the membrane is connected to outlet pressure zone and disconnected from the inlet pressure zone thereby providing a pressure reducing valve function of the pressure reducing valve, and that in a second switching state of the switch valve unit the pressure zone positioned on the second side of the membrane is connected to inlet pressure zone and disconnected from the outlet pressure zone thereby providing a shut off valve function of the pressure reducing valve.

The pressure reducing valve according to the invention has a switch valve unit being coupled to the inlet pressure zone, the outlet pressure zone and to the pressure zone positioned on the second side of the membrane.

In a first switching state of the switch valve unit of the pressure reducing valve according to the invention, the pressure zone positioned on the second side of the membrane is connected to outlet pressure zone and disconnected from the inlet pressure zone thereby providing a pressure reducing valve function of the pressure reducing valve.

In a second switching state of the switch valve unit of the pressure reducing valve according to the invention, the pressure zone positioned on the second side of the membrane is connected to inlet pressure zone and disconnected from the outlet pressure zone thereby providing a shut off valve function of the pressure reducing valve.

The pressure reducing valve according to the invention can be operated as pressure reducing valve and as shut off valve.

It is no longer necessary to install a separate shut off valve in series connection with the pressure reducing valve if a shut off valve function is needed. This saves space and costs.

The switch valve unit of pressure reducing valve according to the invention may comprise a 3/2 way valve, wherein in a first switching state of the 3/2 way valve the pressure zone positioned on the second side of the membrane is connected to outlet pressure zone and disconnected from the inlet pressure zone, and wherein in a second switching state of the 3/2 way valve the pressure zone positioned on the second side of the membrane is connected to inlet pressure zone and disconnected from the outlet pressure zone.

The switch valve unit of pressure reducing valve according to the invention may alternatively comprise a first 2/2 way valve and second 2/2 way valve, wherein in a first switching state of the first 2/2 way valve and in a first switching state of the second 2/2 way valve the pressure zone positioned on the second side of the membrane is connected to outlet pressure zone and disconnected from the inlet pressure zone, and wherein in a second switching state of the first 2/2 way valve and in a second switching state of the second 2/2 way valve the pressure zone positioned on the second side of the membrane is connected to inlet pressure zone and disconnected from the outlet pressure zone.

The switch valve unit of pressure reducing valve according to the invention may alternatively comprise a 3/3 way valve, wherein in a first switching state of the 3/3 way valve the pressure zone positioned on the second side of the membrane is connected to outlet pressure zone and disconnected from the inlet pressure zone, and wherein in a second switching state of the 3/3 way valve the pressure zone (positioned on the second side of the membrane is connected to inlet pressure zone and disconnected from the outlet pressure zone.

The method for operating the pressure reducing valve is defined in claim 8.

BRIEF DESCRIPTION OF THE DRAWINGS

Preferred developments of the invention are provided by the dependent claims and the description which follows. Exemplary embodiments are explained in more detail on the basis of the drawing, in which:

DETAILED DESCRIPTION OF THE INVENTION

Figure 1:
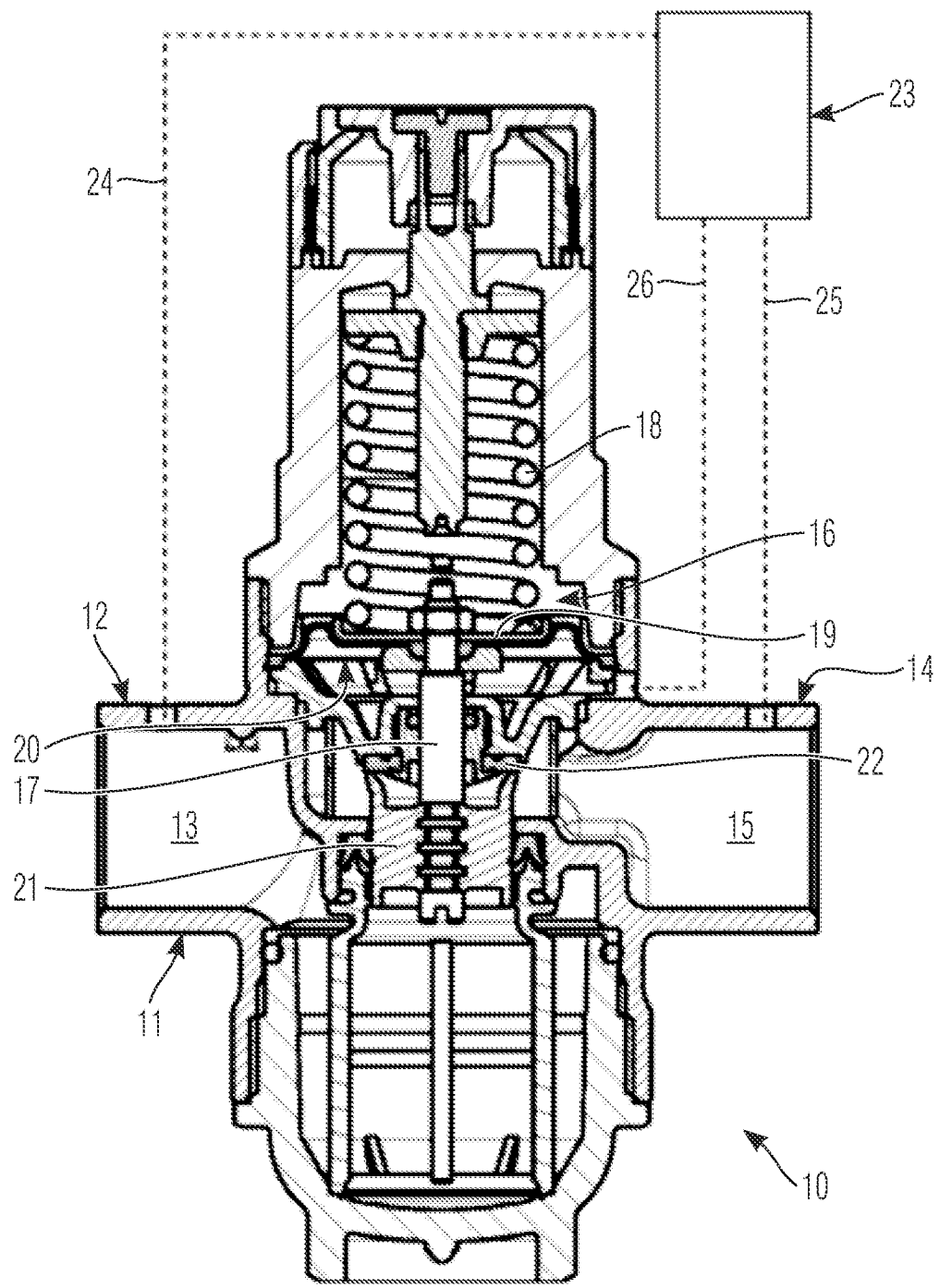
FIG. 1 shows a cross section of a pressure reducing valve having a switch valve unit.

The present invention relates to a pressure reducing valve preferably for use in a potable water system. The pressure reducing valve can be used for gaseous media and liquid media. Preferably, the pressure reducing valve is pressure reducing valve for liquid media, most preferably for potable water.

The pressure reducing valve 10 comprises a housing 11. Said housing 11 has an inlet 12 providing an inlet pressure zone 13 and an outlet 14 providing an outlet pressure zone 15.

The pressure reducing valve 10 further comprises a valve insert 16 positioned within the housing 11.

Said valve insert 16 connects the inlet pressure zone 13 to the outlet pressure zone 15 when the valve insert 16 is opened. Said valve insert 16 separates the inlet pressure zone 13 from the outlet pressure zone 15 when the valve insert 16 is closed.

The valve insert 16 comprises a valve stem 17, a spring element 18 and a membrane 19. The spring element 18 is positioned on a first side of the membrane 19. A pressure chamber 20 is positioned on a second, opposite side of the membrane. The pressure chamber 20 being positioned on the second side of the membrane 19 can also be called membrane pressure zone.

In the shown embodiment, the valve insert 16 further comprises a valve plunger 21 carried by the valve stem 17.

A first force provided by the spring element 18 acts on the first side of the membrane 19 which tends to open the valve insert 16, in the shown embodiment by lifting up the valve plunger 21 from a valve seat 22.

A second force depending on the pressure within the pressure zone 20 acts on the second side of the membrane 19 which tends to close the valve insert 16, in the shown embodiment by pressing the valve plunger 21 against the valve seat 22.

The pressure reducing valve 10 further comprises a switch valve unit 23 being coupled to the inlet pressure zone 13, the outlet pressure zone 15 and to the pressure zone 20 positioned on the second side of the membrane 19.

In a first switching state of the switch valve unit 23 the pressure zone 20 positioned on the second side of the membrane 19 is connected to outlet pressure zone 15 and disconnected from the inlet pressure zone 13 thereby providing a pressure reducing valve function of the pressure reducing valve 10. When the pressure zone 20 positioned on the second side of the membrane 19 is connected to outlet pressure zone 15, then as a consequence the pressure being present within the outlet pressure zone 15 is present within the pressure zone 20 positioned on the second side of the membrane 19.

In a second switching state of the switch valve unit 23 the pressure zone 20 positioned on the second side of the membrane 19 is connected to inlet pressure zone 13 and disconnected from the outlet pressure zone 15 thereby providing a shut off valve function of the pressure reducing valve 10. When the pressure zone 20 positioned on the second side of the membrane 19 is connected to inlet pressure zone 13, then as a consequence the pressure being present within the inlet pressure zone 13 is present within the pressure zone 20 positioned on the second side of the membrane 19.

The switch valve unit 23 is coupled to the inlet pressure zone 13 by a first pressure line 24, to the outlet pressure zone 15 by a second pressure line 25 and to the pressure zone 20 positioned on the second side of the membrane 19 by a third pressure line 26.

The pressure reducing valve 10 according to the invention can be operated as pressure reducing valve and as shut off valve. It is no longer necessary to install a separate shut off valve in series connection with the pressure reducing valve if a shut off valve function is needed. This saves space and costs.

When the switch valve unit 23 is in the first switching state thereby providing the pressure reducing valve function of the pressure reducing valve 10, and when the pressure reducing valve 10 shall be transferred into the shut off valve function, the switch valve unit 23 becomes switched from the first switching state into the second switching state.

In a first alternative, the switch valve unit 23 becomes permanently switched into the second switching state for providing the shut off valve function of the pressure reducing valve 10.

In a second alternative, the switch valve unit 23 becomes temporarily switched into the second switching state for providing the shut off valve function of the pressure reducing valve 10. In this second alternative, the switch valve unit 23 becomes switched into the second switching state and thereafter into a third switching state in which the pressure zone 20 positioned on the second side of the membrane 19 is disconnected both from the outlet pressure zone 15 and from the inlet pressure zone 13.

Figure 2:
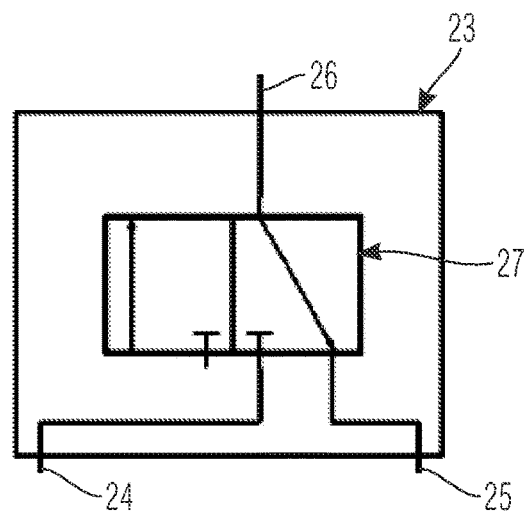
FIG. 2 shows a first embodiment of the switch valve unit in a first first switching state of the switch valve unit.
Figure 3:
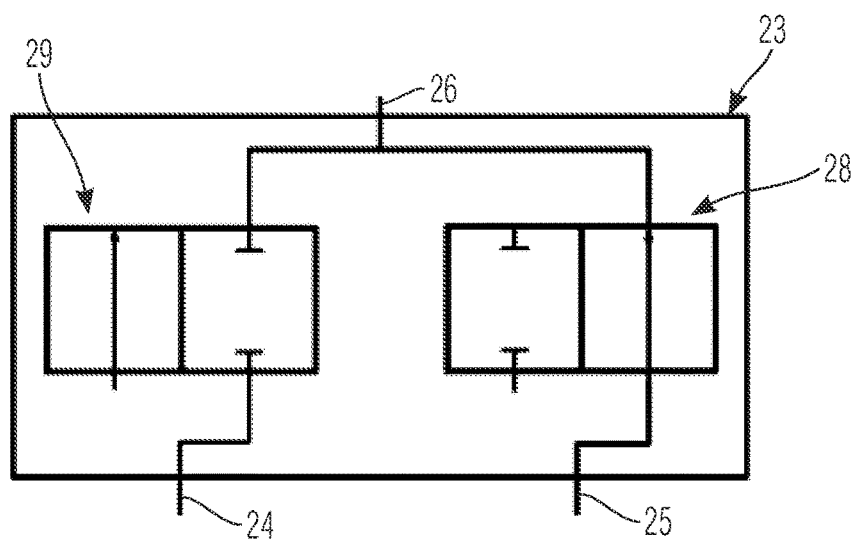
FIG. 3 shows a second embodiment of the switch valve unit in a first first switching state of the switch valve unit; and, FIG. 4 shows a third embodiment of the switch valve unit in a third switching state of the switch valve unit.
Figure 4:
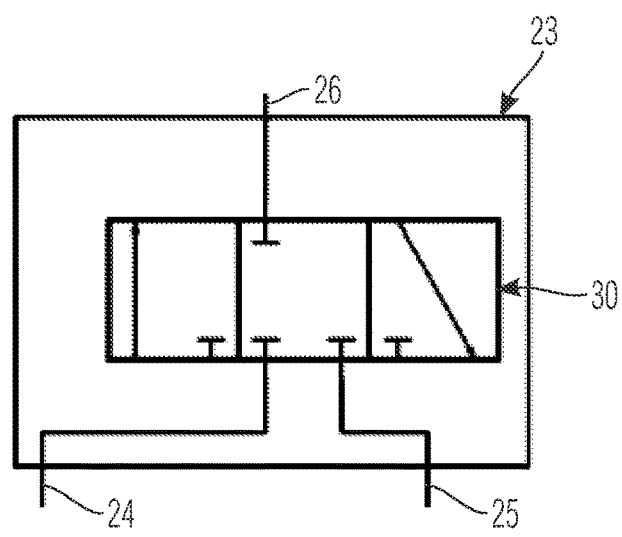

FIGS. 2 to 4 show different embodiments of the switch valve unit 23 of the pressure reducing valve 10 according to the invention.

In the embodiment of FIG. 2, the switch valve unit 23 comprises a 3/2 way valve 27. In a first switching state of the 3/2 way valve 27 (shown in FIG. 2) the pressure zone 20 positioned on the second side of the membrane 19 is connected to outlet pressure zone 15 and disconnected from the inlet pressure zone 13. This corresponds to the first switching state of the switch valve unit 23. In a second switching state of the 3/2 way valve 27 the pressure zone 20 positioned on the second side of the membrane 19 is connected to inlet pressure zone 13 and disconnected from the outlet pressure zone 15. This corresponds to the second switching state of the switch valve unit 23.

When using a 3/3 way valve 30 instead of the 3/2 way valve 27 (see FIG. 4), the switch valve unit 23 can in addition provide the third switching state (shown in FIG. 4) in which the pressure zone 20 positioned on the second side of the membrane 19 is disconnected both from the outlet pressure zone 15 and from the inlet pressure zone 13.

In the embodiment of FIG. 3, the switch valve unit 23 comprises a first 2/2 way valve 28 and second 2/2 way valve 29.

In a first switching state of the first 2/2 way valve 28 and in a first switching state of the second 2/2 way valve 29 (shown in FIG. 3) the pressure zone 20 positioned on the second side of the membrane 19 is connected to outlet pressure zone 15 and disconnected from the inlet pressure zone 13. This corresponds to the first switching state of the switch valve unit 23.

In a second switching state of the first 2/2 way valve 28 and in a second switching state of the second 2/2 way valve 29 the pressure zone 20 positioned on the second side of the membrane 19 is connected to inlet pressure zone 15 and disconnected from the outlet pressure zone 13. This corresponds to the second switching state of the switch valve unit 23.

In the first switching state of the first 2/2 way valve 28 the first 2/2 way valve 28 is opened. In the first switching state of the second 2/2 way valve 29 the second 2/2 way valve 29 is closed.

In the second switching state of the first 2/2 way valve 28 the first 2/2 way valve 28 is closed. In the second switching state of the second 2/2 way valve 29 the second 2/2 way valve 29 is opened.

When the first 2/2 way valve 28 is in the second switching state, namely closed, and when in addition the second 2/2 way valve 29 is in the first switching state, namely closed, the switch valve unit 23 of FIG. 3 provides the third switching state in which the pressure zone 20 positioned on the second side of the membrane 19 is disconnected both from the outlet pressure zone 15 and from the inlet pressure zone 13.

LIST OF REFERENCE SIGNS 10 pressure reducing valve
11 housing
12 inlet
13 inlet pressure zone
14 outlet
15 outlet pressure zone
16 valve insert
17 valve stem
18 spring element
19 membrane
20 pressure zone
21 valve plunger
22 valve seat
23 switch valve unit
24 first pressure line
25 second pressure line
26 third pressure line
27 3/2 way valve
28 2/2 way valve
29 2/2 way valve
30 3/3 way valve

The invention claimed is:

1. A pressure reducing valve, comprising:
   a housing comprising:
   an inlet providing an inlet pressure zone, and
   an outlet providing an outlet pressure zone,
   wherein the housing defines a pressure zone configured to disconnect from the inlet pressure zone and disconnect from the outlet pressure zone;
   a valve insert positioned within the housing, wherein the valve insert connects the inlet pressure zone to the outlet pressure zone when the valve insert is opened, and wherein the valve insert separates the inlet pressure zone from the outlet pressure zone when the valve insert is closed,
   wherein the valve insert comprises a spring element and a membrane,
   wherein a force provided by the spring element acts on a first side of the membrane which tends to open the valve insert, and
   wherein the pressure zone is positioned on a second side of the membrane; and
   a switch valve unit coupled to the inlet pressure zone, the outlet pressure zone, and the pressure zone,
   wherein the switch valve unit is configured to have a first switching state and a second switching state,
   wherein in the first switching state, the switch valve unit is configured to connect the pressure zone to the outlet pressure zone and disconnect the pressure zone from the inlet pressure zone thereby providing a pressure reducing valve function of the pressure reducing valve, and
   wherein in the second switching state, the switch valve unit is configured to connect the pressure zone to the inlet pressure zone and disconnect the pressure zone from the outlet pressure zone thereby providing a shut off valve function of the pressure reducing valve.

2. The pressure reducing valve as claimed in claim 1, wherein
   the switch valve unit comprises a 3/2 way valve,
   wherein in the first switching state of the 3/2 way valve, the pressure zone is connected to the outlet pressure zone and disconnected from the inlet pressure zone, and
   wherein in the second switching state of the 3/2 way valve the pressure zone is connected to the inlet pressure zone and disconnected from the outlet pressure zone.

3. The pressure reducing valve as claimed in claim 1,
   wherein the switch valve unit comprises a first 2/2 way valve and second 2/2 way valve,
   wherein in a first switching state of the first 2/2 way valve and in a first switching state of the second 2/2 way valve, the pressure zone is connected to the outlet pressure zone and disconnected from the inlet pressure zone, and
   wherein in a second switching state of the first 2/2 way valve and in a second switching state of the second 2/2 way valve, the pressure zone is connected to the inlet pressure zone and disconnected from the outlet pressure zone.

4. The pressure reducing valve as claimed in claim 3,
   wherein in the first switching state of the first 2/2 way valve, the first 2/2 way valve is opened, and in the first switching state of the second 2/2 way, valve the second 2/2 way valve is closed, and
   wherein in the second switching state of the first 2/2 way valve, the first 2/2 way valve is closed, and in the second switching state of the second 2/2 way valve, the second 2/2 way valve is opened.

5. The pressure reducing valve as claimed in claim 3, wherein in the second switching state of the first 2/2 way valve and in the first switching state of the second 2/2 way valve, the switch valve unit is in a third switching state in which the pressure zone is disconnected both from the inlet pressure zone and from the outlet pressure zone.

6. The pressure reducing valve as claimed in claim 1,
   wherein the switch valve unit comprises a 3/3 way valve,
   wherein in the first switching state of the 3/3 way valve, the pressure zone is connected to the outlet pressure zone and disconnected from the inlet pressure zone, and wherein in the second switching state of the 3/3 way valve, the pressure zone is connected to the inlet pressure zone and disconnected from the outlet pressure zone.

7. The pressure reducing valve as claimed in claim 6, wherein in a third switching state of the 3/3 way valve the pressure zone is disconnected both from the inlet pressure zone and from the outlet pressure zone.

8. A method for operating a pressure reducing valve according to claim 1, the method comprising:
when the switch valve unit is in the first switching state thereby providing the pressure reducing valve function of the pressure reducing valve, switching the switch valve unit from the first switching state into the second switching state to provide the shut off valve function of the pressure reducing valve.

9. The method as claimed in claim 8, wherein switching the switch valve unit to the second switching state permanently switches the switch valve unit to the second switching state.

10. The pressure reducing valve as claimed in claim 1,
wherein the pressure reducing valve is configured to cause a pressure within the outlet pressure zone to be present within the pressure zone when the switch valve unit is in the first switching state, and
wherein the pressure reducing valve is configured to cause a pressure within the inlet pressure zone to be present within the pressure zone when the switch valve unit is in the second switching state.

11. A method for operating a pressure reducing valve, the method comprising:
reducing a pressure of a fluid using the pressure reducing valve,
wherein the pressure reducing valve comprises:
a housing comprising:
an inlet providing an inlet pressure zone, and
an outlet providing an outlet pressure zone,
wherein the housing defines a pressure zone configured to disconnect from the inlet pressure zone and disconnect from the outlet pressure zone,
a valve insert positioned within the housing, wherein the valve insert connects the inlet pressure zone to the outlet pressure zone when the valve insert is opened, and wherein the valve insert separates the inlet pressure zone from the outlet pressure zone when the valve insert is closed,
wherein the valve insert comprises a spring element and a membrane,
wherein a force provided by the spring element acts on a first side of the membrane which tends to open the valve insert, and
wherein the pressure zone is positioned on the second side of the membrane; and
a switch valve unit coupled to the inlet pressure zone, the outlet pressure zone, and the pressure zone,
wherein the switch valve unit is configured to have a first switching state and a second switching state,
wherein in the first switching state, the switch valve unit is configured to connect the pressure zone to the outlet pressure zone and disconnect the pressure zone from the inlet pressure zone thereby providing a pressure reducing valve function of the pressure reducing valve,
wherein in the second switching state, the switch valve is configured to connect unit the pressure zone to the inlet pressure zone and disconnect the pressure zone from the outlet pressure zone thereby providing a shut off valve function of the pressure reducing valve,
wherein when the switch valve unit is in the first switching state thereby providing the pressure reducing valve function, and the pressure reducing valve is transferred into the shut off valve function, the switch valve unit becomes switched from the first switching state into the second switching state,
wherein the switch valve unit comprises a first 2/2 way valve and second 2/2 way valve, wherein in a first switching state of the first 2/2 way valve and in a first switching state of the second 2/2 way valve the pressure zone is connected to the outlet pressure zone and disconnected from the inlet pressure zone, and
wherein in a second switching state of the first 2/2 way valve and in a second switching state of the second 2/2 way valve the pressure zone is connected to inlet pressure zone and disconnected from the outlet pressure zone.

12. The method as claimed in claim 11, wherein the switch valve unit is configured to switch into the second switching state and thereafter into a third switching state in which the pressure zone is disconnected both from the outlet pressure zone and from the inlet pressure zone.

13. The method as claimed in claim 11,
wherein the pressure reducing valve is configured to cause a pressure within the outlet pressure zone to be present within the pressure zone when the switch valve unit is in the first switching state, and
wherein the pressure reducing valve is configured to cause a pressure within the inlet pressure zone to be present within the pressure zone when the switch valve unit is in the second switching state.

* * * * *